United States Patent
Litke et al.

(10) Patent No.: US 9,804,878 B2
(45) Date of Patent: Oct. 31, 2017

(54) USING A STATUS INDICATOR FOR A MERGE OPERATION FOR WRITING DATA ASSOCIATED WITH A VIRTUAL MACHINE

(71) Applicant: Red Hat, Inc., Raleigh, NC (US)

(72) Inventors: Adam Litke, Bethel Park, PA (US); Federico Simoncelli, Fano (IT)

(73) Assignee: Red Hat, Inc., Raleigh, NC (US)

( * ) Notice: Subject to any disclaimer, the term of this patent is extended or adjusted under 35 U.S.C. 154(b) by 31 days.

(21) Appl. No.: 14/628,906

(22) Filed: Feb. 23, 2015

(65) Prior Publication Data
US 2016/0246628 A1    Aug. 25, 2016

(51) Int. Cl.
*G06F 9/455* (2006.01)

(52) U.S. Cl.
CPC ............ *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,135,930 B1 | 3/2012 | Mattox et al. | |
| 8,176,017 B2* | 5/2012 | Havewala | G06F 3/0605 707/690 |
| 8,301,874 B1 | 10/2012 | Heidingsfeld et al. | |
| 2013/0212161 A1 | 8/2013 | Ben-Shaul et al. | |
| 2014/0149347 A1 | 5/2014 | Ben-Shaul et al. | |
| 2014/0297979 A1 | 10/2014 | Baron et al. | |

OTHER PUBLICATIONS

Posey; Managing Hyper-V Snapshots (Part 3), VirtualizationAdmin.com, Oct. 29, 2013.*
Finn, Aidan; Windows Server 8 Hyper-V-Snapshots & Live Merge, Youtube, Mar. 24, 2012.*
Armstrong; What happens if I start a virtual machine that is merging snapshot files? [Hyper-V]; blogs.msdn.microsoft.com/virtual_pc_guy/2009/04/21/what-happens-if-i-start-a-virtual-machine-that-is-merging-snapshot-files-hyper-v/; Apr. 21, 2009.*
Sorensen; View Progress of Hyper-V Snapshot Merge; tritoneco.com/2013/01/25/view-progress-of-hyper-v-snapshot-merge/; Jan. 25, 2013.*
Litke, et al., "Live Merge," Sep. 16, 2014, ovirt.org/Features/Live_Merge.
Goldblatt Kevin Alon, "Bug 1161127—[JSONRPC]Live merge—failed to delete snapshot on 2nd attempt—first attempt was interrupted with shutdown of vm," Posted Nov. 6, 2014, bugzilla.redhat.com/show_bug.cgi?id=1161127.
Litke, Adam, "Thanks for Live Snapshots, Where's Live Merge?," KVM Forum, Oct. 16, 2014, orvit.org/Features/Live_Mergedevel@ovirt.org.
Litke, Adam, "Change in vdsm[master]: Live Merge: add reconcileVolumeChain verb," Posted Aug. 21, 2014, lists.fedorahosted.org/pipermail/vdsm-patches/2014-August/067368.html.

* cited by examiner

*Primary Examiner* — Bing Zhao
(74) *Attorney, Agent, or Firm* — Lowenstein Sandler LLP (57) ABSTRACT

A virtual machine may be identified. A status indicator associated with a last volume of a series of volumes of a virtual disk that is associated with the virtual machine may be received. The virtual machine may be executed to write new data to the last volume of the series of volumes or a previous volume of the series of volumes in view of the status indicator that is associated with the last volume of the series of volumes of the virtual disk.

16 Claims, 8 Drawing Sheets

USING A STATUS INDICATOR FOR A MERGE OPERATION FOR WRITING DATA ASSOCIATED WITH A VIRTUAL MACHINE

TECHNICAL FIELD

Aspects of the disclosure generally relate to virtual machines and, more specifically, relate to a status indicator for a merge operation associated with a virtual machine.

BACKGROUND

A virtual machine (VM) may be a software-based emulation of computer hardware. For example, the VM may operate based on computer architecture and functions of computer hardware resources associated with hard disks or other such memory. A virtual disk that emulates a hard disk or memory may be utilized by the VM. Thus, the VM may emulate a physical computing environment, but requests for a hard disk or memory may be managed by a virtualization layer which translates these requests to the underlying physical computing hardware resources. The virtualization layer may be part of a virtual machine management application that manages the virtual disk.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure relate to a status indicator for a merge operation associated with a virtual machine. The virtual machine (VM) may be based on a virtual disk (also referred to as a virtual disk image) that is a series of volumes. One or more of the volumes may be a snapshot, which may refer to a copy changes made to the virtual disk at a particular point in time. For example, when a change is made to the virtual disk after the snapshot has been created, the snapshot may be used to store a copy of the changed area of the virtual disk as it was prior to the change so that a prior state of the virtual disk may be reconstructed (e.g., by rolling back or undoing the changes through utilizing the copy of the changed areas). Thus, the snapshot may contain differences or changes that were made to a virtual disk between the time that the snapshot was created and the parent of the snapshot (e.g., the virtual disk or another snapshot).

The virtual disk may be based on a series of volumes. For example, a first snapshot may be created based on the virtual disk and subsequent changes to the virtual disk may be recorded. A second snapshot may be based on the first snapshot and subsequent changes to the first snapshot may then be recorded in the second snapshot. Furthermore, a third snapshot may then be based on the second snapshot and may be based on the second snapshot and subsequent changes to the second snapshot may be saved in the third snapshot. A final volume, created after the third snapshot, may be used to record new data. Thus, the virtual disk may based on a series of volumes that includes the original virtual disk, the first snapshot, the second snapshot, the third snapshot, and the final volume. Such a series of volumes may also be referred to as a volume chain. Each snapshot may be a read-only volume or component of the series of volumes or the volume chain so that each snapshot represents the virtual disk at a particular point in time (e.g., between the time the snapshot is created and a following snapshot is created). The final or last volume of the series may store current changes that are made to the virtual disk or any prior volumes by the virtual machine. Thus, the final volume is the only volume that is actively updated by a virtual machine using the virtual disk A merge operation may be performed on the virtual disk. In some embodiments, a live merge operation may refer to an operation performed on a virtual disk to change the series of volumes of the virtual disk as a virtual machine is writing or creating changes to the last volume of the virtual disk. For example, as previously described, the virtual disk may be based on a series of volumes (e.g., an original virtual disk, a first snapshot, a second snapshot, a third snapshot, and a final volume). A live merge operation may merge or combine two of the volumes in the series of volumes or the volume chain. For example, the final volume of the series of volumes may be merged into the previous volume of the series of volumes (e.g., the third snapshot). The merging or combining of the volumes may result in the adding of the changed data that has been recorded in the final volume to the previous volume as well as current changes made by the VM to the virtual disk being saved in the previous volume as opposed to being saved in the final volume of the series of volumes.

The virtual machine infrastructure environment may include a hypervisor (e.g., a virtual machine monitor) that creates and operates the VM on a host system as well as a management server that manages the host systems. Each of the hypervisor and the management server may create and modify data that identifies the series of volumes which a virtual disk is based upon. For example, the hypervisor may manage the virtual disk file and a header of the virtual disk file may include information that identifies the series of volumes of the virtual disk. Furthermore, the management server may store metadata (e.g., data in another file stored at the same storage device as the virtual disk file) that also identifies the series of volumes that are used in the virtual disk as well as the series of volumes used by other virtual disks used by other hypervisors that manage other virtual disks and other virtual machines. Each of the hypervisor and the management server may update its respective identification of the series of volumes of the virtual disk in response to a merge operation that is performed on the virtual disk while the virtual machine is currently writing data to the virtual disk (i.e., the live merge operation). For example, a virtual disk used by a virtual machine may be associated with a series of volumes including four volumes 'ABCD.' A live merge operation on the virtual disk may merge the volume D with the volume C while the virtual machine is writing new data to volume D. A successful live merge operation may result in the series of volumes of the virtual disk including 'ABC' where the volume 'C' includes the data of the last volume 'D' as well as new data written by the virtual machine being stored in volume 'C.'

The live merge operation may include multiple steps or stages to merge the last volume of the series of volumes with the previous volume. For example, as previously described, the live merge operation may merge the last volume to the previous volume (e.g., second to last volume) in the series of volumes while the virtual machine is currently writing to the last volume of the virtual disk. A first stage of the live merge operation may copy data from the last volume to the previous volume. For example, the changed data that is stored in the last volume may be copied to the previous volume. However, since the virtual machine is actively executing and still writing new data that results in changes that are also stored in the last volume, the additional data may need to be copied from the last volume to the previous volume as the additional data is written to the previous volume. Such a stage may be referred to as an active mirroring stage. Thus, data may be copied from the last volume to the previous volume and new data may be written to the last volume as data is copied from the last volume to the previous volume. The new data may subsequently also be copied from the last volume to the previous volume.

Another stage of the live merge operation may change the volume to which the virtual machine is writing new data to from the last volume to the previous volume. Such a stage may be referred to as a pivot stage. After the pivot stage, the virtual machine may write new data to the previous volume as opposed to the last volume. The last volume may then be deleted after the data has been copied from the last volume to the previous volume and the pivot stage has completed to store new data from the virtual machine to the previous volume.

An interruption of the live merge operation during the active mirroring stage or during the pivot stage may occur. For example, a management server, host system, or other components in a system architecture using virtual machines may be subjected to a failure or hardware malfunction. The interruption of the live merge operation during the active mirroring stage or the pivot stage may result in the identification of the series of volumes in each of the metadata updated by the hypervisor and the management server being identical. For example, during the active mirroring stage that is to merge a last volume 'D' into a previous volume 'C' of a series of volumes 'ABCD,' each metadata may identify the series of volumes as 'ABCD.' Furthermore, during the pivot stage, each metadata may also identify the series of volumes as 'ABCD.' However, the interruption of the live merge operation during the pivot stage may prevent the changing of the metadata from 'ABCD' to 'ABC' to reflect that the last volume 'D' has been successfully merged into the previous volume 'C'.

An execution of a virtual machine using the virtual disk may result in corruption of data if the virtual machine has written new data to the volume 'C' after the hypervisor has successfully completed a live merge operation, but the management server, after the interruption of the live merge operation, restarts the virtual machine based on the virtual disk that includes the volume 'D' that should have been removed. In order to prevent the corruption of data after an interruption of the live merge operation, a status indicator may be set by the management server in response to receiving a request to execute the pivot stage during a live merge operation. For example, a hypervisor may perform the active mirroring stage and upon completing the active mirroring stage (e.g., data from the last volume has been copied to the previous volume), then the hypervisor may transmit a request to the management server to request initiation of the pivot stage to switch new data to be written from the last volume to the previous volume. In response to receiving the request to initiate the pivot stage, the management server may update a status indicator that identifies that the last volume has been subjected to the pivot stage and the management server may transmit data to the hypervisor on the host system to proceed with the pivot stage. Subsequently, if the live merge operation is interrupted during the pivot stage and a virtual machine is to execute using the virtual disk that was subjected to the live merge operation, the status indicator may first be checked to determine if a live merge operation had reached the pivot stage. If the live merge operation was interrupted during the pivot stage as indicated from the status indicator, then identification of the series of volumes from each metadata may be updated to remove the last volume and the virtual machine may then be allowed to execute based on the identified series of volumes without the last volume. However, if the status indicator specifies that the pivot stage was not requested, then no volumes may be removed from the identified series of volumes and the virtual machine may be allowed to execute based on the identified series of volumes including the last volume.

Aspects of the present disclosure may prevent the corruption of a virtual disk by preventing a virtual machine to write new data to an incorrect volume of the virtual disk after a live merge operation has been interrupted. For example, the status indicator may be used to identify whether a live merge operation has been interrupted and to identify the stage of the live merge operation when the interruption occurred.

Figure 1:
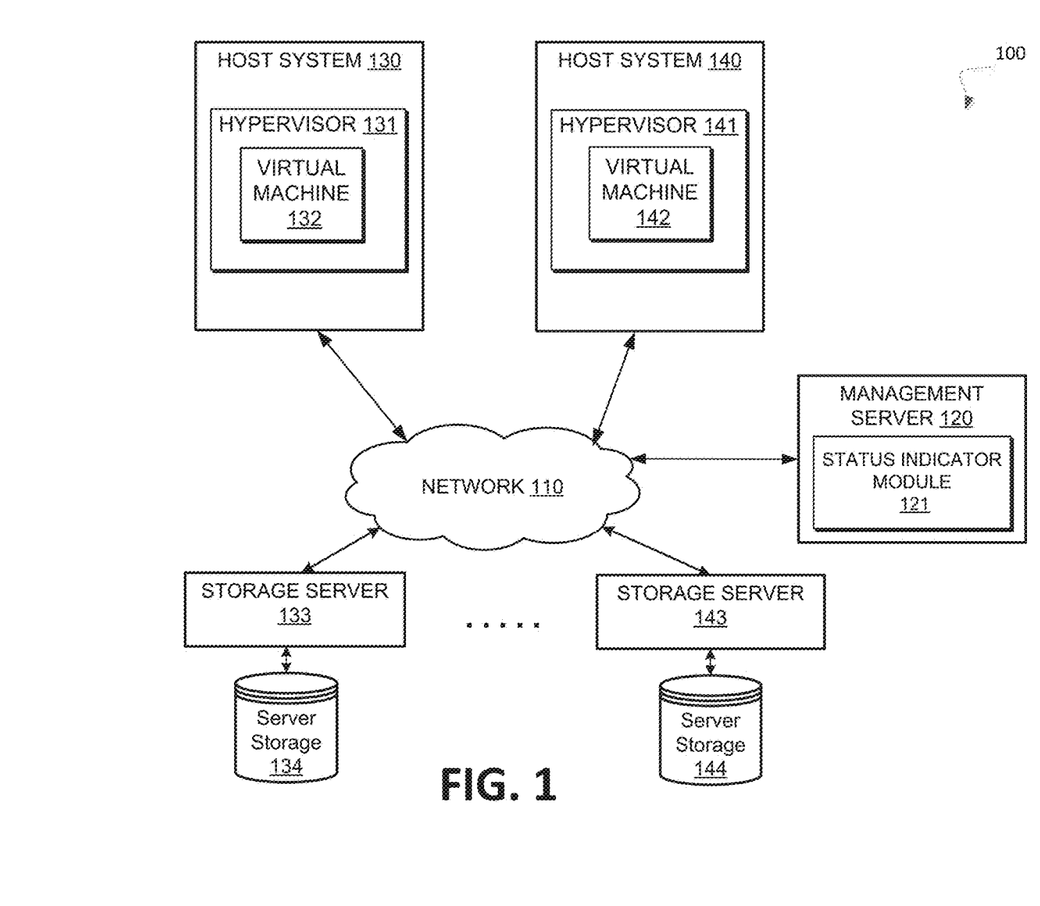
FIG. 1 illustrates an example system architecture in which embodiments of the disclosure may operate.

FIG. 1 is an example system architecture 100 for various implementations of the disclosure. The system architecture 100 may include host systems 130 and 140 coupled to one or more storage servers 133 and 143 via a network 110. The network 110 may be a public network (e.g., the Internet), a private network (e.g., a local area network (LAN) or wide area network (WAN)), or a combination thereof. Network 110 may include a wireless infrastructure, which may be provided by one or multiple wireless communications systems, such as a wireless fidelity (WiFi) hotspot connected with the network 110 and/or a wireless carrier system that can be implemented using various data processing equipment, communication towers, etc.

The host systems 130 and 140 may each include a hypervisor (e.g., hypervisors 131 or 141) that are each associated with a virtual machine (e.g., virtual machine 132 and virtual machine 142). The host systems 130 or 140 may include, but are not limited to, desktop computers, laptop computers, rackmount servers, routers, switches, tablet computers, mobile phones, or any other type of computing device. The host systems 130 and 140 may include hardware resources may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources may be used to execute software, including one or more operating systems, virtual machines (e.g., a virtual machine based on a mobile communications device), or other applications.

The hardware resources of a host system may provide one or more services such as, but not limited to, networking services, storage services, and software libraries. In some embodiments, the hypervisor (e.g., hypervisor 131 or 141), also referred to as a virtual machine monitor (VMM) and/or a virtual machine (e.g., virtual machine 132 or 142) may use the one or more services that are provided by the host system. The hypervisors 131 or 141 is an application that executes on a host system 130 or 140 to manage virtual machines 132 or 142. In particular, the hypervisor may instantiate or start, migrate, pause, or perform another type of event associated with virtual machines 132 and 142. For example, the hypervisor 131 or 141 may perform a live merge operation for a virtual disk used by the virtual machine 132 or 142. In some embodiments, the hypervisor 131 or 141 may further coordinate metadata changes in the system architecture 100, such as creating and deleting virtual disk images, creating and merging snapshots, copying images between storage domains, creating templates and storage allocation for block devices of the hardware resources such as hard drives or other storage devices. In some embodiments, the hypervisor 131 or 141 may update a series of volumes identified in a virtual disk image file that is stored at a server storage device 134 or 144.

The hypervisor 131 or 141 may include a virtualization API and a multi-platform emulator. Each virtual machine 132 and 142 may execute a guest operating system that can be accessed by a client system over the network 110. Each virtual machine 132 and 142 may further run guest applications using the guest operating system.

As shown in FIG. 1, the system architecture 100 may further include a management server 120. In some embodiments, the management server 120 may manage the utilization of the hardware resources of the host systems 130 and 140 as well as aspects of the storage servers 133 and 143 and the corresponding server storage devices 134 and 144. The management server 120 may include a status indicator module 121 that may detect indicate whether an initiation of a pivot stage has been requested by a hypervisor as part of a live merge operation. For example, the hypervisor 131 or 141 may perform an active mirroring stage of a live merge operation. Upon completing the active mirroring stage (e.g., when data from the last volume has been copied to the previous volume), the hypervisor 131 or 141 may transmit a request to the management server 120 to allow the initiation of the pivot stage of the live merge operation. In response to receiving the request, the management server 120 may update a status indicator corresponding to the last volume in metadata stored in a file at the server storage devices 134 or 144. The management server 120 may then transmit data to the hypervisor that indicates that the hypervisor 131 or 141 may initiate the pivot stage of the live merge operation. Further details with regard to the status indicator module 121 are described below.

Figure 2:
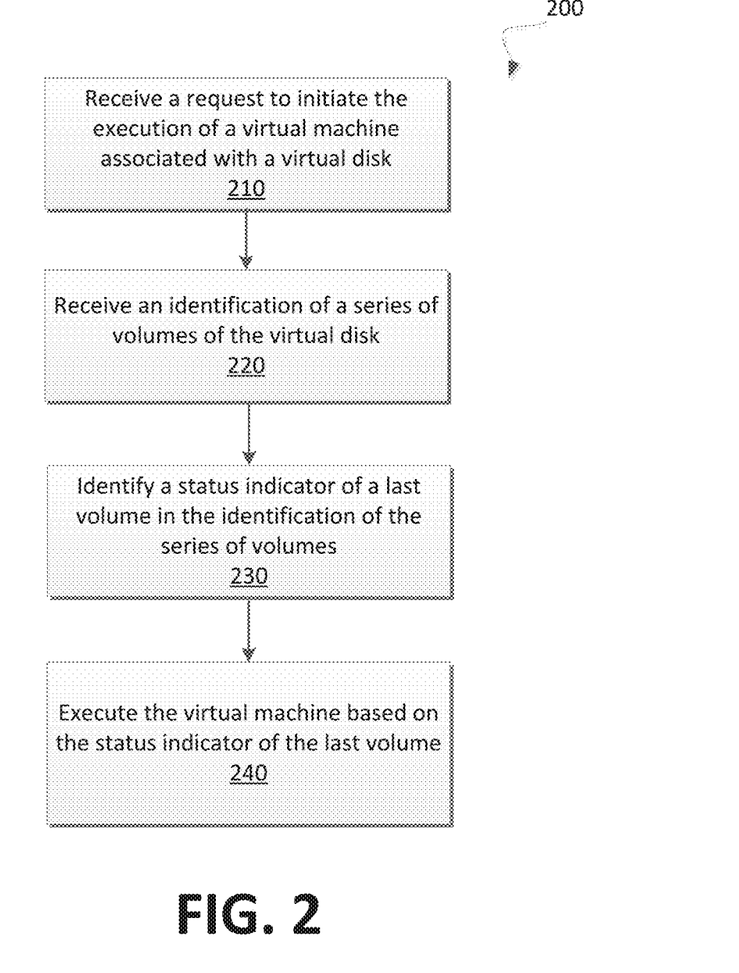
FIG. 2 is a flow diagram of an example method to execute a virtual machine based on a status indicator for a volume of a virtual disk in accordance with some embodiments.

FIG. 2 is a flow diagram of an example method 200 to execute a virtual machine based on a status indicator for a volume of a virtual disk. The method 200 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 200 may be performed by a status indicator module 121 of a management server as described with relation to FIG. 1.

As shown, the method 200 may begin by the processing logic receiving a request to initiate the execution of a virtual machine associated with a virtual disk (block 210). In alternative embodiments, the method 200 may begin when a management server restarts and enters into a recovery phase that may determine that a previously running live merge operation is no longer running. The method 200 may then begin in order to determine the final result of the previously run live merge operation. A live merge operation may have been previously performed on the virtual disk before the request to initiate the execution of the virtual machine with the virtual disk. For example, the virtual machine may have been previously executed with the virtual disk, a live merge operation may have been requested and at least partially performed, and a failure or other such hardware malfunction may have occurred which resulted in the halting of the execution of the virtual machine and/or the interruption of the live merge operation. In response to receiving the request to initiate execution of the virtual machine, the processing logic may receive an identification of a series of volumes of the virtual disk (block 220). For example, metadata from an additional file stored with the virtual disk file may be received. The received metadata may be maintained and updated by a management server that is associated with multiple hypervisors and multiple virtual disks. The processing logic may subsequently identify a status indicator of a last volume in the identification of the series of volumes (block 230). For example, the status indicator for the last volume in the identification of the series of volumes may be received. The processing logic may then execute the virtual machine with the virtual disk based on the status indicator for the last volume (block 240). For example, the last volume may be removed from the identification of the series of volumes if the status indicator for the last volume specifies that an initiation pivot stage was requested during a live merge operation. The virtual machine may then be allowed to execute with the virtual disk after the last volume has been removed. Alternatively, the last volume may not be removed from the identification of the series of volumes if the status indicator for the last volume specifies that the pivot operation was not requested during the live merge operation. Thus, the virtual machine may be allowed to execute with the virtual disk without the removal of any volumes if the status indicator does not specify that the initiation of the pivot stage was requested. In some embodiments, the virtual machine may be instructed to execute the virtual machine with the virtual disk based on the status indicator. For example, an instruction may be transmitted to a host system associated with the virtual machine.

Figure 3:
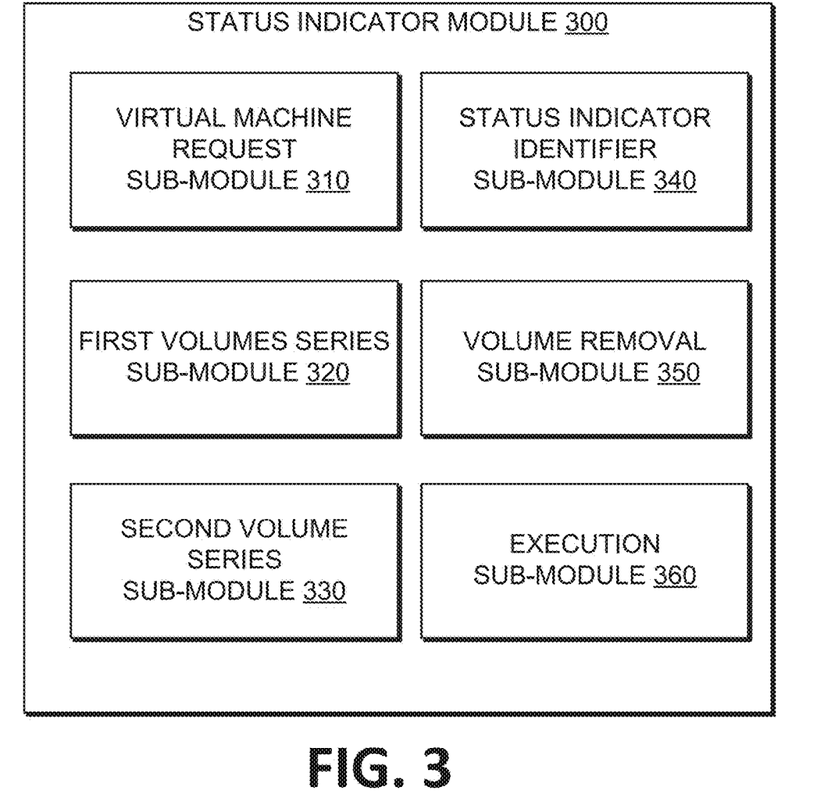
FIG. 3 illustrates an example status indicator module in accordance with some embodiments of the disclosure.

FIG. 3 illustrates an example status indicator module 300. In general, the status indicator module 300 may correspond to the status indicator module 121 of FIG. 1. The status indicator module 300 may include a virtual machine request sub-module 310, a first volume series sub-module 320, a second volume series sub-module 330, a status indicator identifier sub-module 340, a volume removal sub-module 350, and an execution sub-module 360. In alternative embodiments, the functionality of one or more of the sub-modules may be combined or divided.

As shown in FIG. 3, the status indicator module 300 may include a virtual machine request sub-module 310 that may request a start to the execution of a virtual machine with a virtual disk. The first volume series sub-module 320 may retrieve a first identification of a series of volumes associated with the virtual disk and the second volume series sub-module 330 may retrieve a second identification of a series of volumes associated with the virtual disk. The first identification may be retrieved from the header of the virtual disk file corresponding to the virtual disk and the second identification may be retrieved from metadata included in an additional file stored with the virtual disk file. The status indicator sub-module 340 may identify a status indicator that is included in the second identification of the series of volumes. For example, the status indicator for the last volume included in the second identification of the series of volumes may be identified. Furthermore, the status indicator sub-module 340 may set (e.g., provide a value for) the status indicator in the second identification of the series of volumes in response to receiving a request from a hypervisor to initiate a pivot stage of a live merge operation. The volume removal sub-module 350 may remove the last volume from both the first identification of the series of volumes and the second identification of the series of volumes based on the status indicator. Furthermore, the execution sub-module 360 may execute the virtual machine with the virtual disk after the status indicator has been received.

Figure 4A:
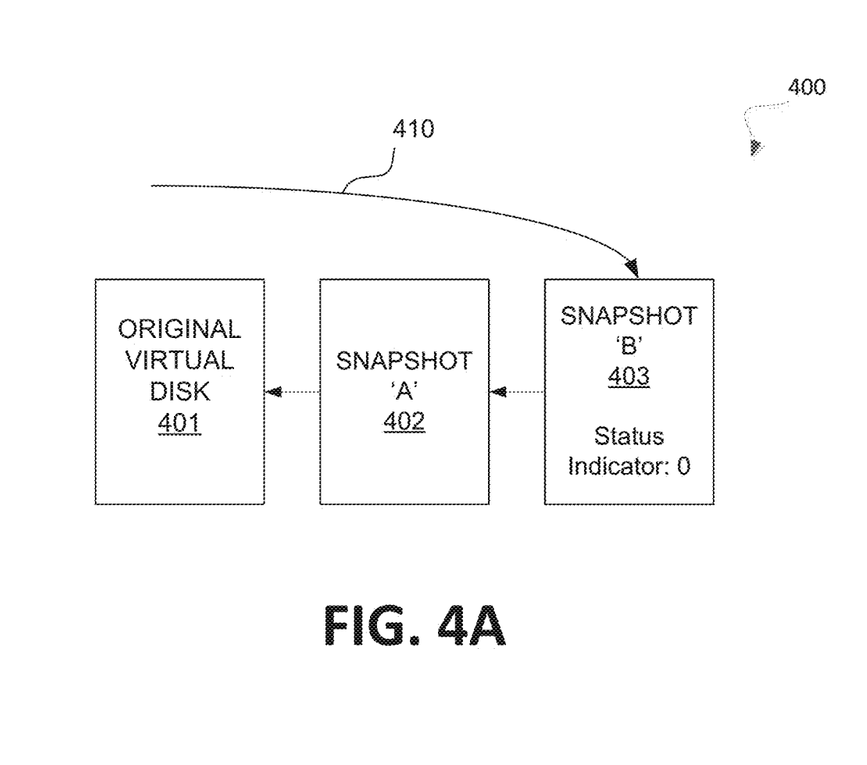
FIG. 4A is an illustrated example of a series of volumes with a status indicator associated with a virtual disk of a virtual machine in accordance with some embodiments of the disclosure.

FIG. 4A is an illustrated example of a series of volumes 400 with a status indicator associated with a virtual disk of a virtual machine. In general, the series of volumes 400 may be received by the status indicator module 121 or 300 of FIG. 1 or 3.

As shown in FIG. 4A, the series of volumes 400 may include a first volume 401 corresponding to an original virtual disk (i.e., the base volume), a volume 402 corresponding to a first snapshot 'A' of the original virtual disk, and a volume 403 corresponding to a second snapshot 'B' of the prior volume 402. The virtual disk corresponding to the series of volumes 400 may be used by a virtual machine. For example, new data 410 written by the virtual machine may be stored in the third volume 403 as the third volume 403 is the last volume in the series of volumes 400. The volume 401 (e.g., the original virtual disk) may be a read only data corresponding to the original virtual disk and the volume 402 may be a read only data corresponding to changes that were previously made to the original virtual disk before the third volume 403 was created. In some embodiments, the third volume 403 may store changes that were made to the first volume 401 or the second volume 402. A live merge operation may be performed on the virtual disk associated with the series of volumes 400. For example, the third volume 403 may be merged into the second volume 402 while the virtual machine is writing new data to the third volume 403. The third volume 403 may be associated with a status indicator 413 that specifies a particular stage of the live merge operation. For example, the status indicator 404 may not be set or may be provided a first value (e.g., a value of '0') to indicate that the live merge operation is at an active mirroring stage or has not finished the active mirroring stage.

Figure 4B:
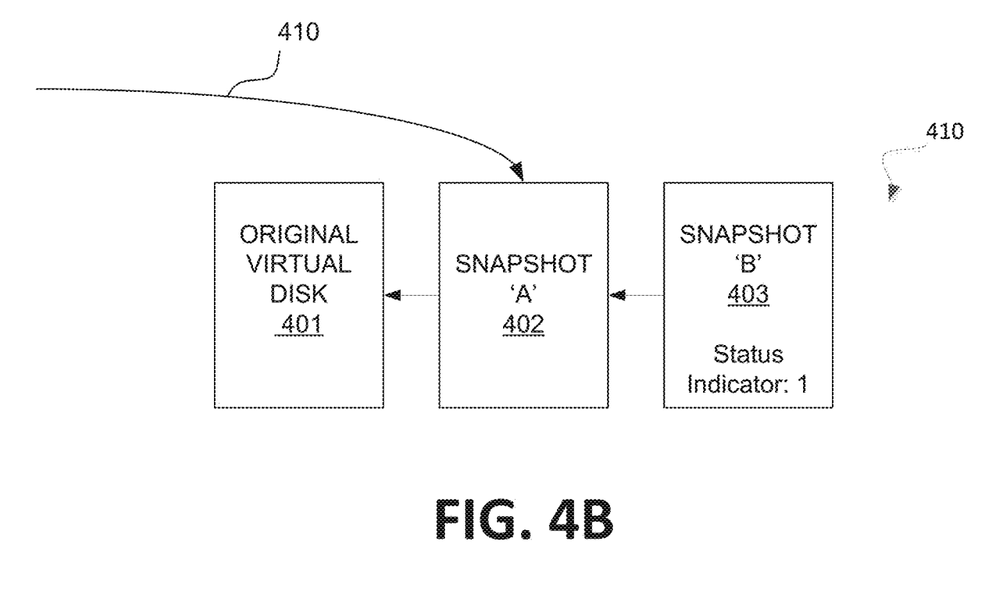
FIG. 4B is an illustrated example of the series of volumes with an updated status indicator associated with the virtual disk of the virtual machine in accordance with some embodiments of the disclosure.

FIG. 4B is an illustrated example of a series of volumes 410 with an updated status indicator for the last volume. In general, the series of volumes 410 may correspond to the series of volumes 400 of FIG. 4A after an updating of the status indicator for the last volume in response to a request to initiate a pivot stage of a live merge operation.

As shown in FIG. 4B, the second series of volumes 410 includes the first volume 401, the second volume 402, and the third volume 403. However, the status indicator 404 associated with the third volume 403 has been changed from the first value (e.g., a '0') to a second value (e.g., a '1'). The status indicator 404 may be changed in response to receiving a request from a hypervisor associated with a virtual machine executing with the virtual disk that is associated with the series of volumes 410. For example, the request may be to initiate a pivot stage of the live merge operation so that new data 410 is written to the second volume 402 as opposed to the third volume 403. In response to receiving the request, a management server may update the status indicator 404 to specify that a hypervisor has requested the initiation of the pivot stage. Additional details regarding updating the status indicator 404 are disclosed in conjunction with FIG. 6.

Thus, a status indicator for the last volume in a series of volumes may be updated to reflect whether a hypervisor has requested the initiation of a pivot stage for a live merge operation. The status indicator may be used to determine whether to remove the last volume from the series of volumes when initiating the execution of a virtual machine.

Figure 5:
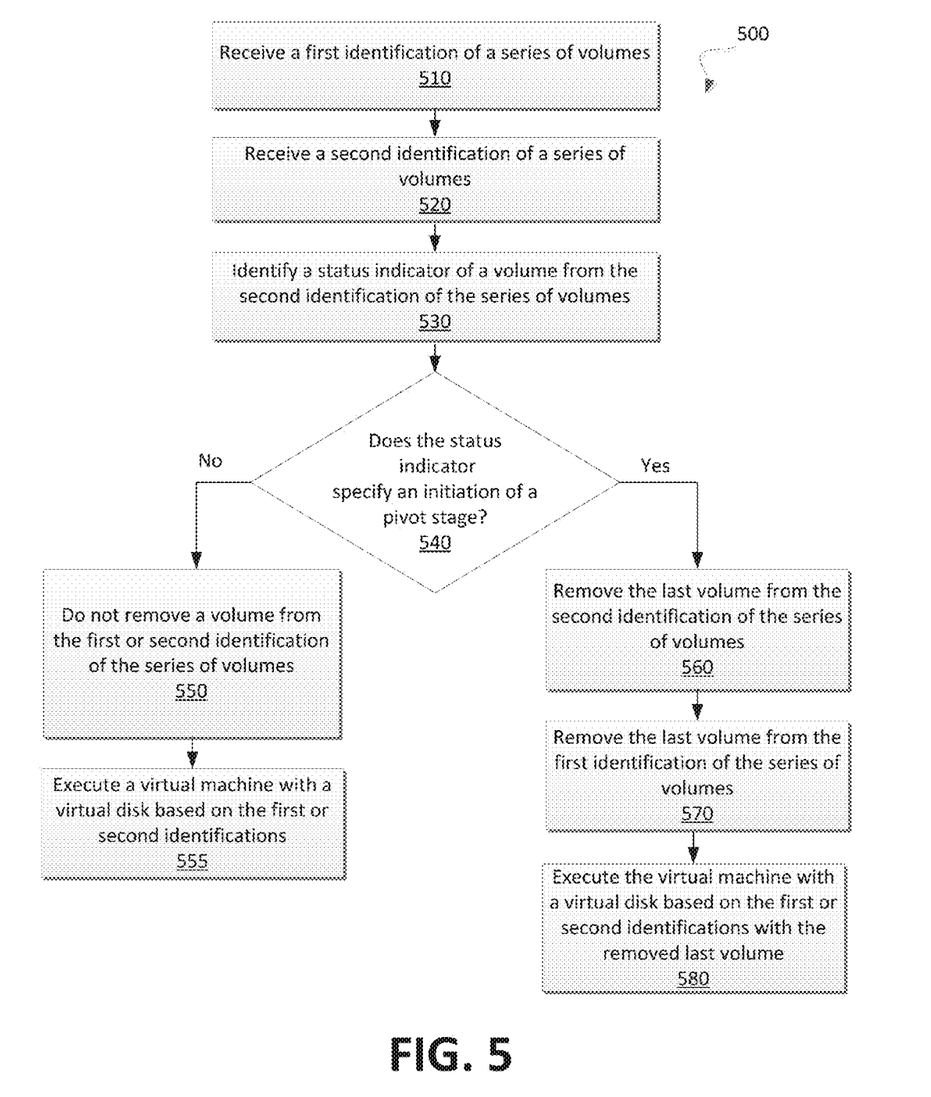
FIG. 5 is a flow diagram of an example method to delete a volume based on a status indicator associated with a virtual disk of a virtual machine in accordance with some embodiments.

FIG. 5 is a flow diagram of an example method 500 to delete a volume based on a status indicator associated with a virtual disk of a virtual machine. The method 500 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 500 may be performed by a status indicator module 121 or 300 as described with relation to FIGS. 1 and 3.

As shown in FIG. 5, the method 500 may begin with the processing logic receiving a first identification of a series of volumes (block 510). For example, the processing logic may receive an identification of volumes from the header of a virtual disk file corresponding to a virtual disk. The processing logic may further receive a second identification of the series of volumes (block 520). The second identification may be received from another file corresponding to the virtual disk file. The processing logic may identify a status indicator of a volume from the second identification of the series of volumes (block 530). For example, the status indicator for the last volume identified in the second identification of the series of volumes may be received. The processing logic may further determine if the status indicator is set at a value that indicates that an initiation of a pivot stage of a live merge operation was requested (block 540). For example, the status indicator may be set at a first value if the initiation of the pivot stage was not requested and the status indicator may be set at a second value if the initiation of the pivot stage was requested during a live merge operation. If the status indicator is not set at a value that indicates that an initiation of a pivot stage of the live merge operation was requested, then the processing logic may not remove a volume from the first or second identifications of the series of volumes (block 550). Furthermore, a virtual machine may be executed with a virtual disk based on the first or second identification of the series of volumes without any volume being removed (block 555). For example, the virtual machine may write new data to the last volume identified in the second identification of the series of volumes. However, if the status indicator is set at a value that indicates an initiation of a pivot stage during a live merge operation, then the last volume from the second identification of the series of volumes may be removed (block 560). Furthermore, the same last volume from the first identification of the series of volumes may also be removed (block 570). Subsequently, the virtual machine may be executed with a virtual disk based on the first or second identification of the series of volumes with the removed volume (block 580). Furthermore, in some embodiments, the data contents of the removed volume may also be deleted or removed from a storage device.

Figure 6:
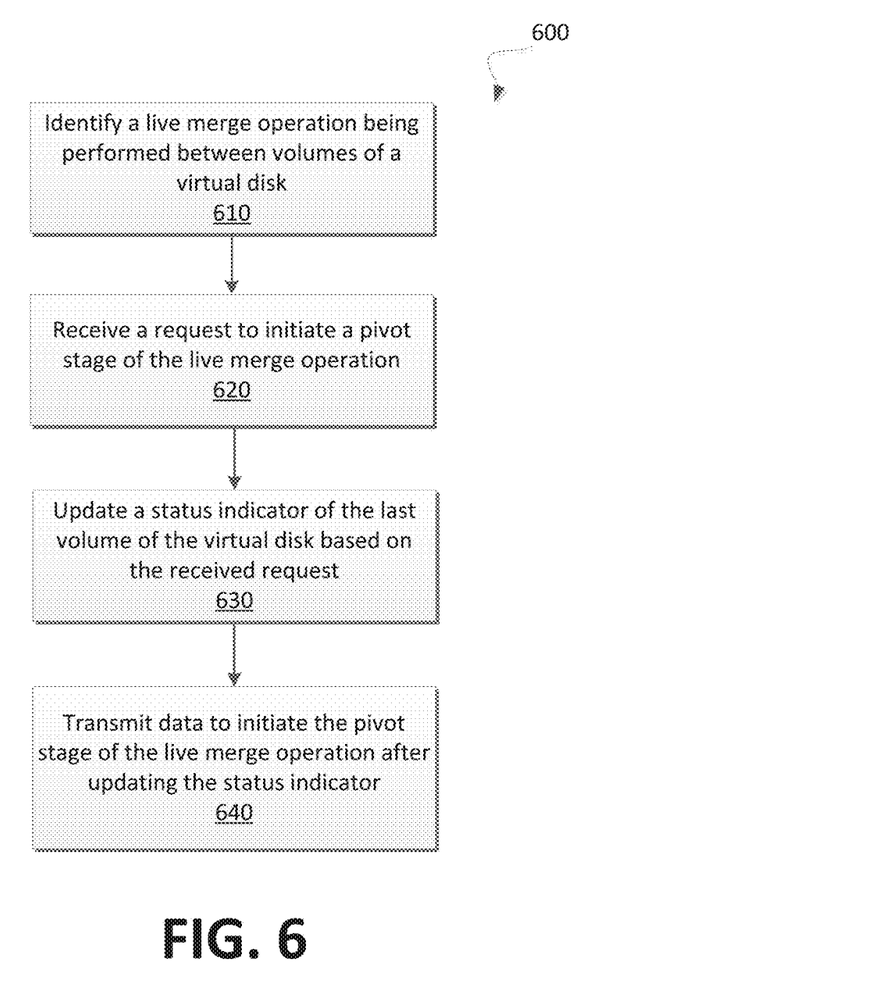
FIG. 6 is a flow diagram of an example method to update a status indicator for a volume of a virtual disk in accordance with some embodiments.

FIG. 6 is a flow diagram of an example method 600 to update a status indicator for a volume of a virtual disk. The method 600 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 600 may be performed by a status indicator module 121 or 300 as described with relation to FIGS. 1 and 3.

As shown in FIG. 6, the method 600 may begin with an identification that a live merge operation is being performed between volumes of a virtual disk (block 610). For example, a live merge operation performed by a hypervisor of a virtual machine between two volumes of a virtual disk may be detected. The processing logic may receive a request to initiate a pivot stage of the live merge operation (block 620). For example, upon completing an active mirroring stage, the hypervisor may transmit a request to a management server to obtain permission to initiate a pivot operation to write new data by the virtual machine from a last volume of the virtual disk to a previous volume (e.g., the second to last) of the virtual disk. Subsequently, the processing logic may update a status indicator in an identification of a series of volumes for the virtual disk (block 630). For example, the status indicator may be updated in response to receiving the request to initiate the pivot stage and/or in response to transmitting permission from the management server to the hypervisor that the hypervisor may initiate the pivot stage of the live merge operation. In some embodiments, the status indicator may be updated from metadata in an additional file corresponding to a virtual disk file. Furthermore, the processing logic may transmit data to initiate the pivot stage of the live merge operation after updating the status indicator (block 640). For example, the initiation of the pivot stage may be allowed after the updating of the status indicator for the last volume that is to be merged into the previous volume during the live merge operation.

Figure 7:
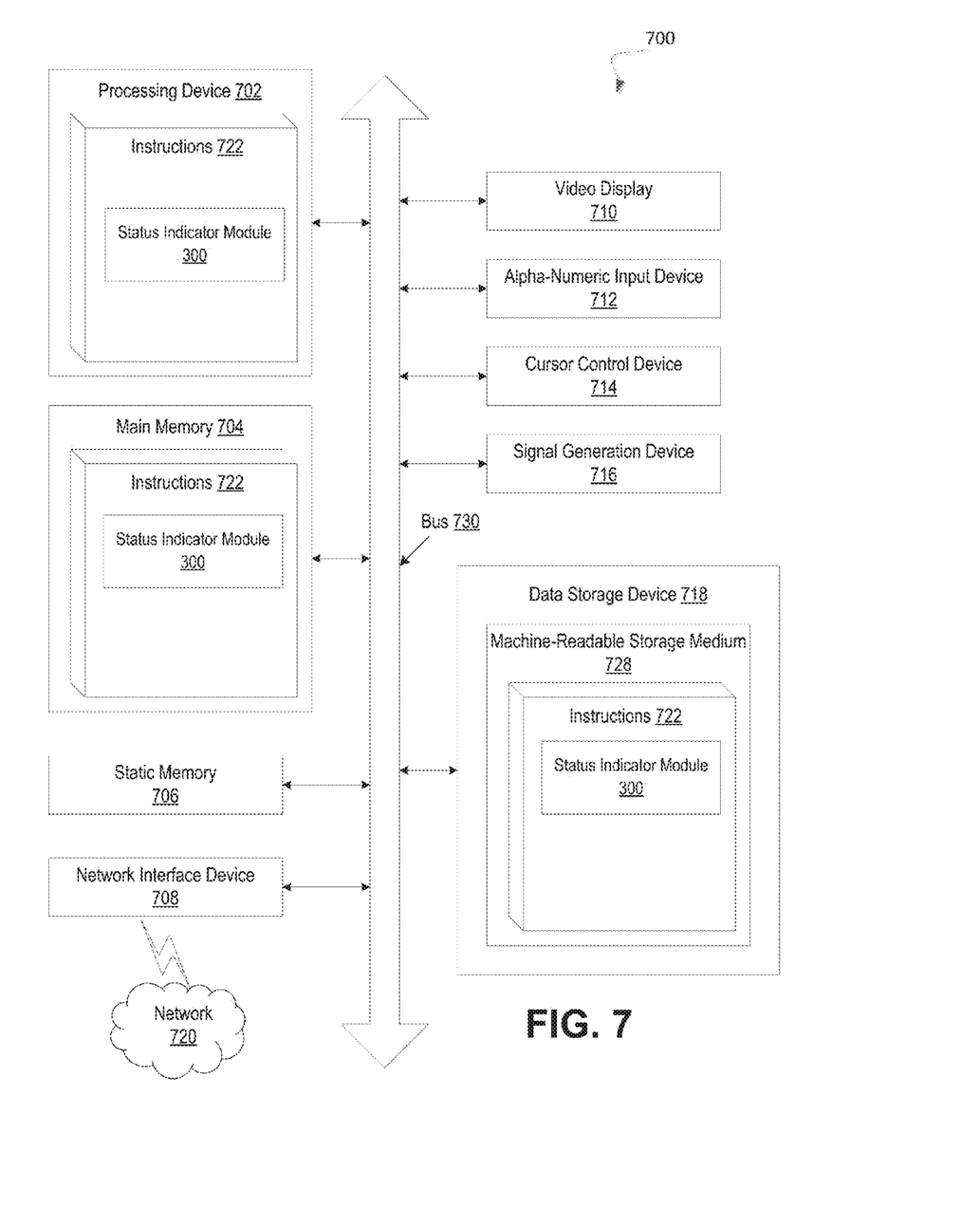
FIG. 7 illustrates a block diagram of an embodiment of a computer system in which some embodiments of the disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a status indicator module (e.g., status indicator module 121 of FIG. 1 and/or status indicator module 300 of FIG. 3) and/or a software library containing methods that call modules or sub-modules in a status indicator module. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   identifying a merge operation associated with a virtual disk of a virtual machine;
   receiving a request to initiate a pivot stage of the merge operation;
   in response to receiving the request to initiate the pivot stage of the merge operation, updating, by a processing device, a status indicator for a last volume of the virtual disk to indicate that the request to initiate the pivot stage of the merge operation has been received after a completion of an active mirroring stage that copies data of the last volume of the virtual disk to a previous volume of the virtual disk; and
   transmitting data to initiate the pivot stage of the merge operation in response to updating the status indicator for the volume of the virtual disk, wherein the pivot stage is associated with a switching of writing new data of the virtual machine from the last volume to the previous volume of the virtual disk.

2. The method of claim 1, wherein the merge operation is performed while the virtual machine is writing new data to the last volume of the virtual disk.

3. The method of claim 1, wherein the merge operation combines the last volume with the previous volume of the virtual disk, and wherein the updating of the status indicator for the volume of the virtual disk comprises updating the status indicator for the last volume.

4. The method of claim 1, wherein the request to initiate the pivot stage of the merge operation is received from a hypervisor associated with the virtual machine.

5. The method of claim 1, wherein the request to initiate the pivot stage is received in response to a completion of an active mirroring stage of the merge operation.

6. A system, comprising:
   a memory; and
   a processing device, operatively coupled with the memory, to:
   identify a merge operation associated with a virtual disk of a virtual machine;
   receive a request to initiate a pivot stage of the merge operation;
   in response to receiving the request to initiate the pivot stage of the merge operation, update a status indicator for a last volume of the virtual disk to indicate that the request to initiate the pivot stage of the merge operation has been received after a completion of an active mirroring stage that copies data of the last volume of the virtual disk to a previous volume of the virtual disk; and
   transmit data to initiate the pivot stage of the merge operation in response to updating the status indicator for the volume of the virtual disk, wherein the pivot stage is associated with a switching of writing new data of the virtual machine from the last volume to the previous volume of the virtual disk.

7. The system of claim 6, wherein the merge operation is performed while the virtual machine is writing new data to the last volume of the virtual disk.

8. The system of claim 6, wherein the merge operation combines the last volume with the previous volume of the virtual disk, and wherein the updating of the status indicator for the volume of the virtual disk comprises updating the status indicator for the last volume.

9. The system of claim 6, wherein the request to initiate the pivot stage of the merge operation is received from a hypervisor associated with the virtual machine.

10. The system of claim 6, wherein the request to initiate the pivot stage is received in response to a completion of an active mirroring stage of the merge operation.

11. A non-transitory machine-readable storage medium comprising data that, when accessed by a processing device, cause the processing device to:
   identify a merge operation associated with a virtual disk of a virtual machine;
   receive a request to initiate a pivot stage of the merge operation;
   in response to receiving the request to initiate the pivot stage of the merge operation, update, by the processing device, a status indicator for a last volume of the virtual disk to indicate that the request to initiate the pivot stage of the merge operation has been received after a completion of an active mirroring stage that copies data of the last volume of the virtual disk to a previous volume of the virtual disk; and
   transmit data to initiate the pivot stage of the merge operation in response to updating the status indicator for the volume of the virtual disk, wherein the pivot stage is associated with a switching of writing new data of the virtual machine from the last volume to the previous volume of the virtual disk.

12. The non-transitory machine-readable storage medium of claim 11, wherein the merge operation is performed while the virtual machine is writing new data to the last volume of the virtual disk.

13. The non-transitory machine-readable storage medium of claim 11, wherein the pivot stage is associated with a switching of writing of new data by the virtual machine from the last volume to a previous volume.

14. The non-transitory machine-readable storage medium of claim 11, wherein the merge operation combines the last volume with the previous volume of the virtual disk, and wherein the updating of the status indicator for the volume of the virtual disk comprises updating the status indicator for the last volume.

15. The non-transitory machine-readable storage medium of claim 11, wherein the request to initiate the pivot stage of the merge operation is received from a hypervisor associated with the virtual machine.

16. The non-transitory machine-readable storage medium of claim 11, wherein the request to initiate the pivot stage is received in response to a completion of an active mirroring stage of the merge operation.

* * * * *